US010306903B2

(12) United States Patent
Galer et al.

(10) Patent No.: US 10,306,903 B2
(45) Date of Patent: Jun. 4, 2019

(54) CHEESE WITH IMPROVED ORGANOLEPTIC AND MELTING PROPERTIES

(71) Applicant: Kraft Foods Group Brands LLC, Northfield, IL (US)

(72) Inventors: Chad D. Galer, Glenview, IL (US); Paul V. Gass, Glenview, IL (US); Aaron S. Handrick, Chicago, IL (US); John A. Hirschey, Winnetka, IL (US); Brian E. LeVine, Evanston, IL (US); Carolyn J. Trinka, Schaumburg, IL (US)

(73) Assignee: Kraft Foods Group Brands LLC, Chicago, IL (US)

( * ) Notice: Subject to any disclaimer, the term of this patent is extended or adjusted under 35 U.S.C. 154(b) by 817 days.

(21) Appl. No.: 14/511,309

(22) Filed: Oct. 10, 2014

(65) Prior Publication Data

US 2015/0024091 A1    Jan. 22, 2015

Related U.S. Application Data

(62) Division of application No. 13/078,673, filed on Apr. 1, 2011, now Pat. No. 8,920,863.

(60) Provisional application No. 61/320,516, filed on Apr. 2, 2010.

(51) Int. Cl.
| | | |
|---|---|---|
| *A23C 19/00* | (2006.01) | |
| *A23C 19/086* | (2006.01) | |
| *A23C 19/068* | (2006.01) | |
| *A23C 19/09* | (2006.01) | |
| *A23C 19/11* | (2006.01) | |
| *A23C 19/16* | (2006.01) | |

(52) U.S. Cl.
CPC .......... *A23C 19/086* (2013.01); *A23C 19/068* (2013.01); *A23C 19/0912* (2013.01); *A23C 19/11* (2013.01); *A23C 19/16* (2013.01)

(58) Field of Classification Search
CPC . A23C 19/086; A23C 19/068; A23C 19/0912; A23C 19/11; A23C 19/16
USPC .............................. 426/89, 96, 518, 580, 582
See application file for complete search history.

(56) References Cited

U.S. PATENT DOCUMENTS

| | | |
|---|---|---|
| 1,737,770 A | 12/1929 | Parsons |
| 2,279,202 A | 4/1942 | Musher |
| 2,648,607 A | 8/1953 | Krusi |
| 3,993,786 A | 11/1976 | Arenson |
| 4,066,791 A | 1/1978 | Corbin, Jr. |
| 5,395,631 A | 3/1995 | Sweeney |
| 5,554,397 A | 9/1996 | Tanaka et al. |
| 5,629,037 A | 5/1997 | Gaffney |
| 5,773,054 A | 6/1998 | Meibach et al. |
| 5,783,236 A | 7/1998 | Meibach et al. |
| 5,902,625 A | 5/1999 | Barz et al. |
| 6,372,268 B1 | 4/2002 | Silver et al. |
| 6,403,138 B1 | 6/2002 | Arora |
| 6,455,092 B1 | 9/2002 | Begueria |
| 6,773,740 B2 | 8/2004 | Hyde et al. |
| 7,157,108 B2 | 1/2007 | Bhaskar et al. |
| 7,169,429 B2 | 1/2007 | Merrill et al. |
| 7,279,192 B2 | 10/2007 | Abboud et al. |
| 7,291,356 B2 | 11/2007 | Merrill et al. |
| 7,579,033 B2 | 8/2009 | Merrill et al. |
| 7,585,537 B2 | 9/2009 | Merrill et al. |
| 7,604,825 B2 | 10/2009 | Johnston et al. |
| 7,651,715 B2 | 1/2010 | Merrill et al. |
| 7,695,745 B2 | 4/2010 | Johnston et al. |
| 7,785,644 B1 | 8/2010 | Vojtech et al. |
| 7,842,325 B2 | 11/2010 | Fitzsimons et al. |
| 2002/0071897 A1 | 6/2002 | Hyde et al. |
| 2004/0037920 A1 | 2/2004 | Choulet et al. |
| 2004/0096565 A1 | 5/2004 | Merrill et al. |
| 2005/0196509 A1 | 9/2005 | Murphy |
| 2006/0057248 A1 | 3/2006 | Lincourt et al. |
| 2006/0115569 A1 | 6/2006 | Merrill et al. |
| 2007/0202235 A1 | 8/2007 | Gramza et al. |
| 2008/0187624 A1 | 8/2008 | Lincourt et al. |
| 2008/0305208 A1 | 12/2008 | Anema et al. |
| 2009/0117228 A1 | 5/2009 | Merrill |
| 2009/0297660 A1 | 12/2009 | Silver et al. |
| 2010/0330233 A1 | 12/2010 | Reyes et al. |

FOREIGN PATENT DOCUMENTS

JP        11318346 A    11/1999

*Primary Examiner* — Leslie A Wong
(74) *Attorney, Agent, or Firm* — Fitch, Even, Tabin & Flannery LLP (57) ABSTRACT

Cheese products with improved flavor, texture and melting properties are disclosed. Topical application of a dairy powder, and in particular a cream cheese powder, to a cheese product improves not only dairy flavor when consumed cold, but unexpectedly also melted appearance, texture and taste.

26 Claims, 8 Drawing Sheets

CHEESE WITH IMPROVED ORGANOLEPTIC AND MELTING PROPERTIES

CROSS-REFERENCE TO RELATED APPLICATIONS

This application is a divisional of prior application Ser. No. 13/078,673, filed Apr. 1, 2011, which claims priority to provisional application Ser. No. 61/320,516, filed Apr. 2, 2010, both of which are hereby fully incorporated by reference herein.

FIELD

The present disclosure relates generally to cheese products, and in particular a cheese product with improved melting properties.

BACKGROUND

Cheese products are widely consumed among households both domestically and abroad. Many times, cheese is packaged and sold in shredded, crumbled, cubed, sliced, block or other pre-cut form for consumer convenience. These pre-cut cheese products may then be used by the consumer in a variety of food applications without the need for time-consuming shredding, cutting or other processing steps.

Many times, these pre-cut cheese products have additives or topical ingredients incorporated to improve or add flavor. For instance, spices, condiments or other food ingredients, such as chili powder, garlic, onion, paprika, dill, horseradish, peppers, and so forth, may be added to the cheese product to create specialized cheese products. In some applications, color or flavor additives may additionally be included as an enhancement. In other instances, additives or topical ingredients may be included to improve quality of shelf life of the cheese products. For example, starch, powdered cellulose, cellulose gels, rice flour or other anticaking ingredients may be added to a package of cheese shreds, cubes or crumbles to prevent agglomeration of the cheese product during processing or after packaging. In other applications, natamycin or other like substances may be added as a natural mold inhibitor to increase shelf-life.

Many of these additives or topical ingredients are in the form of a powder that is sprinkled, mixed in with, or otherwise applied to the cheese product at some point in the manufacturing or packaging process. In the past, application of powders to cheese products has sometimes been found to result in undesirable organoleptic properties, such as a pasty, chalky or dry mouthfeel. In some instances, the powders may be visible to the consumer, thus detracting from the appearance of the cheese product and sometimes even being mistaken as mold growth. The powders also may restrict the melting properties of the cheese product when used in applications where heat is applied to the cheese and/or food product. For instance, the cheese product may melt unevenly or incompletely in comparison to a cheese product without the additive or topical ingredient. Topical powders may also negatively impact the creamy mouthfeel of a cheese product upon melting.

Attempts at improving melting characteristics of cheese products have been made. For instance, reduced-fat cheese products are sometimes perceived as having inferior taste, creaminess, melting properties and other organoleptic qualities when compared to full-fat cheese products. In U.S. Pat. No. 5,876,770, a thin layer of liquid fat is sprayed onto the surface of the reduced-fat cheese product to help overcome these perceptions and provide a reduced fat product more akin to full-fat cheese products. However, these methods may require sophisticated manufacturing capabilities to achieve the desired application of the liquid fat and may be limited by the amount of liquid fat that may be added while still meeting a reduced-fat claim. Additionally, these methods are used to compensate for lowered fat levels in the cheese itself, and it may be undesirable to add a layer of liquid fat in many applications, such as when the cheese product to which it is applied is not a reduced-fat cheese.

In U.S. Pat. No. 2,279,202, molten fat is applied to the surface of grated Parmesan cheese in an effort to protect against deterioration, such as flavor loss, dehydration, molding or hardening, of the grated cheese compositions and to prevent seepage of butterfat from the cheese. The molten fat enrobes the grated cheese particles and is allowed to congeal thereon. Other materials may be combined with the molten fat prior to application to the grated cheese particles depending upon the desired characteristics of the finished cheese product. For example, a skim milk powder or flour may be mixed with the molten fat to aid in absorbing butterfat and preventing seepage, while also enhancing cheese flavor or creaminess in the final product. However, application of molten fat to certain types of cheese products, especially relatively small shreds, cubes, or crumbles of cheddar, mozzarella, and other similar cheeses, may lead to a pasty granular cheese composition or caking and clumping within the product package, which is undesirable to the end-consumer. Moreover, for certain types of cheese having higher moisture contents, application of a molten fat or other heated additives may lead to oxidation of oils and/or oil separation in the cheese, causing the development of off-flavors during the shelf life of the cheese product.

Dairy powders are also known and used in a variety of food and beverage applications. Cheese powders specifically are also used in an assortment of food and beverage applications. They are commonly used in shelf-stable products, for example, as a seasoning for dry snacks or as a base in making cheese sauces. Dairy powders, including cheese powders, have been incorporated into cheese formulations at various stages of manufacturing to modify shelf-stability and flavoring. Often, the dairy or cheese powders are incorporated directly into the cheese formulation at a specific processing step rather than topically applied to a cheese product, such as a shred, cube or crumble. Dairy powders also have been used to reduce adherence between slices of cheese. However, even when used in this manner, many of these applications require relatively large quantities of dairy powders, such as a one to one weight ratio of dairy powder to sliced cheese, the use of other additives or ingredients, or specific processing steps after introduction of the powders, such as dehydration, to achieve the desired end-result.

SUMMARY

Dairy powder coatings may be topically applied to cheese products, especially relatively small cheese pieces such as shreds, crumbles, or small cubes, to unexpectedly improve flavor and melting properties of the cheese product. The coating is applied to the exterior surface of a plurality of these cheeses pieces to provide a relatively dry coating. The coating need not cover the entire exterior surface of each cheese piece, but should be applied in an amount sufficient to reduce agglomeration at low temperatures but still improve melting, flavor, and other properties of the cheese. By one approach, the dairy powder coats from about 15% to about 100% of the surface area of the plurality of cheese pieces. Preferably, the dairy powder coats from about 35% to about 90%, and more preferably from about 50% to about 80% of the surface area of the cheese pieces.

The dairy powder coatings applied to the cheese pieces are of a relatively low moisture content and water activity in order to reduce agglomeration of the pieces. The coatings may include one or more dairy powders, and optionally other additives. Dairy powders included in the coatings may be known in the art, including any commercially available dairy powder, such as dehydrated cheese, dried cream, or fatted milk protein concentrate ("MPG"), or a combination thereof. Powdered cheese compositions are especially well-suited for the coating of cheese pieces.

In one aspect, the coatings may be topically applied to the cheese pieces at amounts of about 1% to about 15% by weight of the cheese product. Preferably, the dairy powders are topically applied at amounts of about 1% to about 9% by weight, more preferably from 1% to 6%, or even more preferably from about 1% to about 3% by weight of the cheese product.

DETAILED DESCRIPTION

In one aspect, dry coatings including dairy powders may be topically applied to cheese products, especially relatively small cheese pieces such as shreds, crumbles, or small cubes, to improve not only the flavor, but, unexpectedly, also the melting properties of the cheese product. The term "dry coating" refers to a substantially solid coating without a liquid component at room temperature or the temperature at which the coating is applied, and is not intended to refer to a coating that is devoid of all moisture whatsoever. The cheese product may be of any variety, such as mild cheddar, sharp cheddar, mozzarella, including low-moisture part-skim ("LMPS") mozzarella, Monterey jack, pepper jack, Colby, Romano, Parmesan, asiago, provolone, queso quesadilla, asadero, Havarti, Swiss, Muenster, or Gouda, among others, and/or blends thereof. In one approach, the cheese product is prepared from natural cheese.

The cheese product may be of any suitable size, such as shreds, cubes, or crumbles. The dairy powder coating is especially well-suited for small pieces of cheese with high surface area to volume ratios intended to be packaged together and used as a melted topping or melted within a food dish. In one approach, the cheese product may be comprised of individual cheese pieces of a size and shape wherein enough surface area is exposed to the dairy powder such that application of the dairy powder results in improved flavor, organoleptic properties and/or melting properties of the cheese product. In one aspect, a plurality of cheese pieces are provided that are preferably about 1.0 mm to about 5.0 mm in width and about 6.55 mm to about 65.0 mm in length, although cheese pieces of other sizes may also be used without deviating from the invention described herein. The coating is applied to the exterior surface of these cheeses pieces to provide a relatively dry coating. The coating need not cover the entire exterior surface area of the cheese pieces, but should be applied in an amount sufficient to reduce agglomeration at low temperatures but still improve melting, flavor, and other properties of the cheese. By one approach, the dairy powder coats from about 15% to about 100% of the surface area of the plurality of cheese pieces. Preferably, the dairy powder coats from about 35% to about 90%, and more preferably from about 50% to about 80% of the exterior surface area of the cheese pieces. If the cheese pieces are cheese shreds, the cheese shreds may be finely shredded or of a thicker variety. For instance, the cheese shreds may be approximately 1"×⅛"×⅓".

The dairy powder coatings applied to the cheese pieces are of a relatively low moisture content and water activity in order to reduce agglomeration of the pieces. In one instance, the dairy powder may contain from about 0.5% moisture to about 10% moisture. Preferably, the dairy powder contains from about 0.5% to about 5% moisture and more preferably from about 0.5% to about 3% moisture. The dairy powders applied to the surface of the cheese product may be known in the art, including any commercially available dairy powder. The dairy powders may, for instance, include dehydrated cheese, dried cream, or fatted MPC, or a combination thereof. Other dairy powders may also be used, alone or in combination. Powdered cheese compositions are especially well-suited for the coating of cheese pieces. By one approach, the dairy powder is a dehydrated cream cheese powder. The dehydrated cream cheese powder may be comprised of, for instance, a dehydrated blend of cream cheese (pasteurized milk and cream, cheese culture, salt and carob bean gum), nonfat milk and sodium phosphate. The cream cheese powder may contain more than about 50% by weight cream cheese, less than about 5% by weight nonfat milk, and less than about 5% sodium phosphate. The powder may contain up to about 3% moisture. The powder may also contain approximately 65% total fat, about 9.5% protein and about 14.5% total carbohydrates.

By another approach, the dairy powder is a cheddar cheese powder having cheddar, buttery and cheesy flavor components. The cheddar cheese powder may be comprised of milk, milkfat, salt, sodium citrate, potassium sorbate (preservative), sodium hydroxide, lactic acid, enzymes and cheese culture. The cheddar cheese powder may contain about 4% moisture, about 52% fat, about 5.6% salt and about 35% protein. An example of a suitable cheese powder that is commercially available is CB-1 (Kraft Food Ingredients). Those skilled in the art will appreciate that any number of dairy and/or cheese powders, alone or in combination, may be used depending upon the desired flavors and/or organoleptic and melting properties of the resultant cheese product.

The dairy powder may be of a sufficiently small particle size such that its presence is not immediately apparent upon visual inspection. By one approach, dairy powders with particle sizes that create a flowable powdered coating may be topically applied to cheese products to improve melting characteristics and organoleptic properties.

By one approach, the dairy powders may be topically applied to the cheese products at amounts of about 1% to about 15% by weight of the cheese product. Preferably, the dairy powders are topically applied at amounts of about 1% to about 9% by weight, more preferably from 1% to 6%, or even more preferably from about 1% to about 3% by weight of the cheese product. One skilled in the art will easily appreciate that the amounts of dairy powder topically applied to the cheese product will vary based upon the type and shape of cheese product used, as well as the type of dairy powder applied. For instance, cheddar cheese shreds may require less dairy powder than Parmesan cheese shreds. In other instances, cheddar cheese cubes may require more dairy powder than cheddar cheese shreds. In still other instances, cheese shreds of any variety may require more MPG powder than cream cheese powder. The precise amount needed to result in the desired organoleptic and melting properties is within the skill of one in the art.

The cheese product may have a moisture content of about 30% to about 65%. The difference in moisture contents of the cheese product and the dairy powder is great enough that the dairy powder easily coats and sticks to the relatively moist cheese pieces when topically applied thereto. In one instance, the difference in moisture contents is at least about 20%. In other instances, the difference in moisture contents is up to about 65%. In a preferred approach, the difference in moisture contents is between about 24% to about 28%. One skilled in the art will appreciate that the difference in moisture contents may vary depending upon the type of cheese product to which the dairy powder is applied. For instance, a dairy powder with a low moisture content may be sufficient for coating a soft cheese with a higher moisture content, whereas the same dairy powder may be less effective in coating a semi-hard cheese with a lower moisture content. The selection of a cheese product and dairy powder with a sufficient difference in moisture contents needed to result in a sufficiently coated cheese product is within the skill of one in the art.

There are numerous suitable methods that may be used to apply the dairy powder coating to the cheese product. The dairy powder should be applied topically to a plurality of cheese pieces after the cheese product has been formed, rather than during steps of forming the cheese. In certain instances, the dairy powder is applied by sprinkling on top of the cheese product prior to packaging. In other instances, the dairy powder is applied topically during a processing step, such as shredding, cubing or crumbling. In yet other instances, the dairy powder may be included in the packaging prior or subsequent to filling the package with the cheese product. The dairy powder may also be applied simultaneously with packaging of the cheese product. One skilled in the art will appreciate that, where several cheese pieces are packaged together, the method used should result in sufficient coverage of the surface area of the plurality of cheese pieces, as well as in use of an adequate amount of dairy powder applied to the amount of cheese product overall.

The cheese product may remain below, at, or near refrigerated temperatures during application of the dairy powder. Dairy powder sufficiently adheres to the surface of the cheese product without the need to change the temperature of the cheese product or dairy powder during the manufacturing and packaging process.

Unexpectedly, the topical addition of the dairy powders may improve the dairy flavor of the cheese when eaten cold, with the flavor impressions getting stronger as the amounts of dairy powders added increases. In one approach, the addition of a cream cheese powder results in an increased perception of butter and dairy acid flavors when the cheese product is eaten cold. By another approach, the addition of a cheese powder having cheddar, buttery and cheesy flavor components also results in increased buttery flavor perception when the cheese product is eaten cold. By another approach, addition of a dairy powder containing a combination of a cream cheese powder and cheddar cheese powder also improves dairy and buttery flavor enhancement when the cheese product is eaten cold.

The application of dairy powders to the cheese products also unexpectedly may improve the cold texture of the cheese product. In some instances, cheese product coated by about 1% to about 15% dairy powder by weight of the cheese product results in a cheese product with a softer and less chewy texture when consumed cold.

Unexpectedly, the topical addition of the dairy powders may also improve the dairy flavor of the cheese when melted, with the flavor impressions getting stronger as the amounts of dairy powders added increases. In one approach, the addition of a cream cheese powder results in an increased perception of butter and dairy acid flavors when the cheese product is melted and eaten. By another approach, the addition of a cheese powder having cheddar, buttery and cheesy flavor components also results in increased buttery flavor perception when the cheese product is melted and eaten. By another approach, addition of a dairy powder containing a combination of a cream cheese powder and cheddar cheese powder also improves dairy and buttery flavor enhancement when the cheese product is melted and eaten.

In other instances, application of dairy powders to the cheese products surprisingly and unexpectedly improves the melted texture of the cheese product, including a reduction in oil separation during melting. By one approach, a cheese product containing about 1% to about 15% dairy powder by weight results in a cheese product that melts more evenly and completely when compared to a cheese product without the dairy powder. The melted cheese product also has a softer and smoother mouthfeel when eaten as compared to control cheese products not containing the dairy powders. In one aspect, the improvement in mouthfeel properties increases as the amount of dairy powder topically applied increases.

By one approach, topical application of about 1% to about 15% dairy powder to cheese shreds produces a cheese product with a smooth appearance upon melting. The melted cheese product forms a continuous mass rather than retaining the identity and structural integrity of the individual cheese shreds. In a particular approach, the dairy powder may be a dehydrated cream cheese powder. In other approaches, the dairy powder may be a cheddar cheese powder. Regardless of the type of dairy powder used, its application to the cheese shreds decreases shred identity upon melting and thus decreases the detection of individual cheese shreds within a melted cheese mass as compared to cheese shreds without dairy powders, providing a smoother overall texture in the melted cheese.

The cheese products to which the dairy powder is applied may contain additional ingredients, such as spices, condiments or other food pieces, such as chili powder, garlic, onion, paprika, horseradish, peppers, and so forth. In some applications, color or flavor additives may additionally be included as an enhancement. In other instances, additives or topical ingredients may be added to improve quality of shelf life of the cheese products. Anticaking ingredients are generally known to cause melt restriction, and thus are typically used in limited quantities in applications where smooth, complete melting is desired. However, by one approach, an anticaking agent may be employed in limited quantities to provide the desired anticake benefits without significant melt restriction. For example, starch, powdered cellulose, cellulose gels, rice flour, other anticaking ingredients, or blends thereof may be added to a package of cheese shreds, cubes or crumbles to prevent agglomeration of the cheese product during processing and after packaging. By one approach, a starch-based anticaking ingredient may be added to the dairy powder. In a preferred approach, a cellulose-based anticaking ingredient may be added to the dairy powder. In other applications, natamycin may be added as a natural mold inhibitor to increase shelf-life. A blend of anticaking ingredients and mold inhibitors also may be added. By one approach, a blend of anticake and natamycin may be included at levels of about 3% by weight. In a preferred approach, a blend of cellulose and natamycin may be included at levels of about 2% by weight.

Example 1

Cheese shreds with topically-applied dairy powders were prepared according to the formulations shown in Table 1 below.

TABLE 1

Various cheese shreds coated with dairy powders

| Sample No. | Ingredient | Percent by Weight |
|---|---|---|
| 1 | Mild cheddar cheese shreds | 94 |
|  | Cream cheese powder | 3 |
|  | Anticake/natamycin blend | 3 |
| 2 | Blend of mild cheddar, Monterey jack and Colby cheese shreds | 94 |
|  | Cream cheese powder | 3 |
|  | Anticake/natamycin blend | 3 |
| 3 | Blend of mild cheddar, Asadero, Monterey jack and queso quesadilla cheese shreds | 94 |
|  | Cream cheese powder | 3 |
|  | Anticake/natamycin blend | 3 |
| 4 | Mozzarella cheese shreds | 94 |
|  | Cream cheese powder | 3 |
|  | Anticake/natamycin blend | 3 |
| 5 | Blend of mozzarella, unsmoked provolone, Romano, Parmesan, and asiago cheese shreds | 94 |
|  | Cream cheese powder | 3 |
|  | Anticake/natamycin blend | 3 |

The cream cheese powder used in all formulations in the above example was Cream Cheeztang®, obtained from Kraft Food Ingredients. It comprises at least about 50% by weight of a dehydrated blend of cream cheese (pasteurized milk and cream, cheese culture, salt, and carob bean gum), up to about 5% by weight nonfat dry milk, and up to about 5% by weight sodium phosphate. The nutritional make-up of the powder contained about 9.7% protein, about 14.5% total carbohydrates, and about 65% total fat.

Example 2

A cream cheese powder containing approximately 65% total fat, about 9.5% protein and about 14.5% total carbohydrates was sprinkled in varying amounts onto natural mild cheddar and natural LMPS mozzarella cheese shreds by hand and lightly mixed to produce a substantially even surface coating. Three experimental samples of each cheese were created, with the powder added at 3%, 6%, and 9% by weight to each type of cheese shred. Each sample of cheese shred also contained 3% of an anticaking additive. Forty grams of the cheese shreds having the cream cheese powder was applied evenly to a tortilla. Forty grams of a control mild cheddar cheese and a control LMPS mozzarella were also applied to two separate control tortillas.

The cheese shreds were evaluated for cold appearance prior to melting. As the amount of dairy powder added to the cheese shreds increased from 3% to 9%, visual detection of the powder also increased.

To test melting properties, a skillet was heated to 350° F. The tortillas with the various shredded cheeses were each placed on the skillet for four minutes. The resultant melted cheese tortillas were then evaluated for melted appearance, melted taste, and melted texture.

For all three amounts of dairy powder, the dairy flavor after melting of both the cheddar and mozzarella cheeses improved. As the amount of dairy powder added increased up to 9%, the positive flavor impression also increased. The melted appearance of the cheese also improved. The cheddar and mozzarella cheeses having a dairy powder coating had a smoother and more even appearance upon melting than their control cheese counterparts. Upon consumption after melting, the cheddar and mozzarella cheeses having the dairy powder coating had a softer and smoother mouthfeel than the respective control cheeses. As the amount of dairy powder used increased, so did the soft and smooth mouthfeel of the melted cheese.

Figure 1:
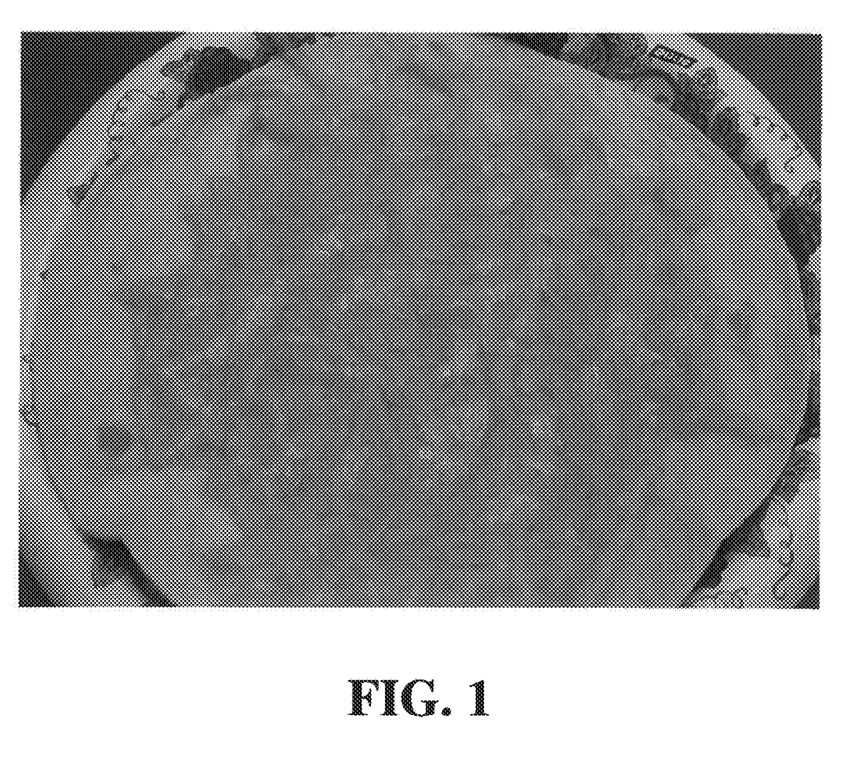
FIG. 1 is a picture of a melted control cheese shred product.
Figure 2:
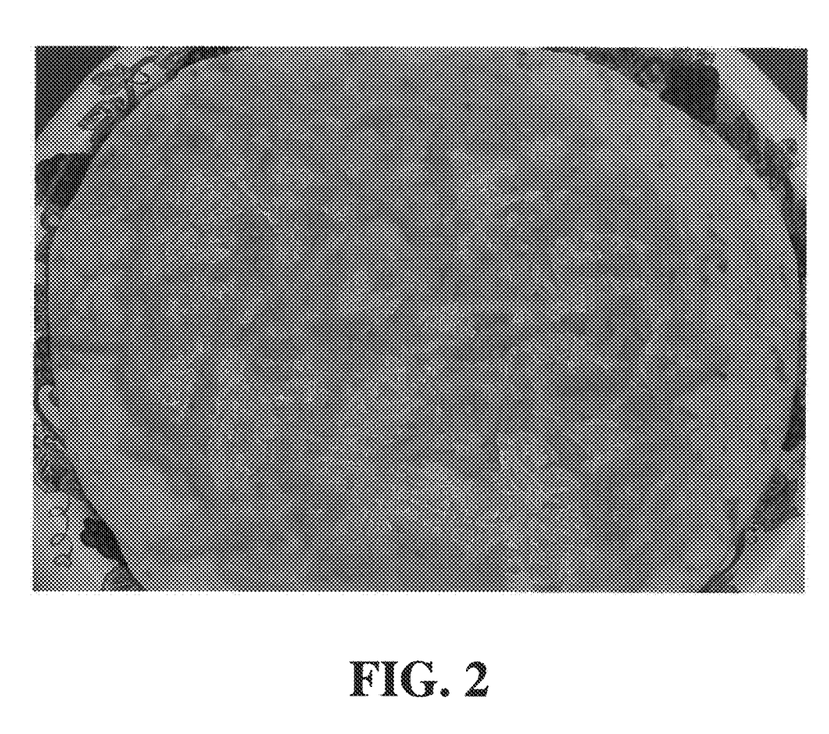
FIG. 2 is a picture of a melted cheese product made of 97 weight percent cheddar cheese shreds and 3 weight percent dairy powder topically applied thereto.
Figure 3:
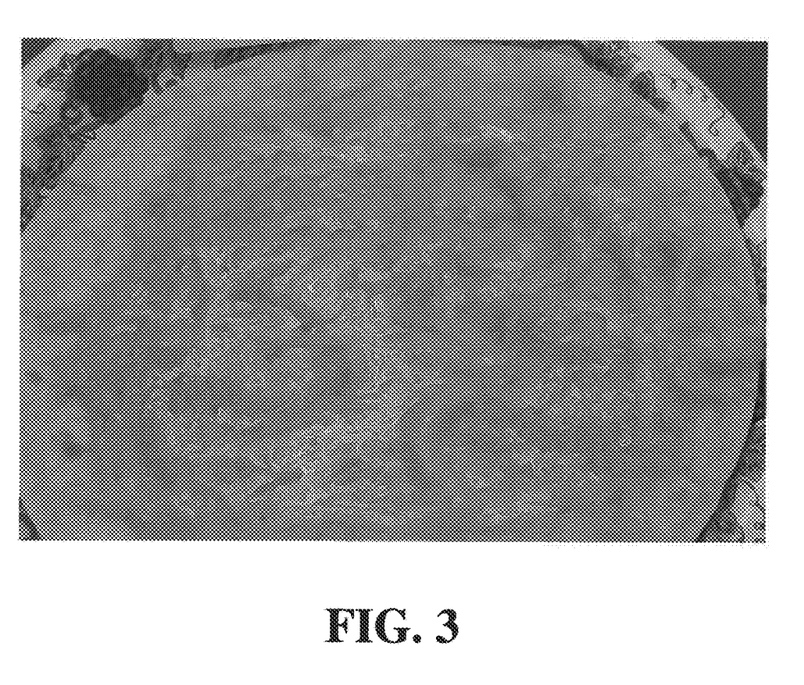
FIG. 3 is a picture of a melted cheese product made of 94 weight percent cheddar cheese shreds and 6 weight percent dairy powder topically applied thereto.
Figure 4:
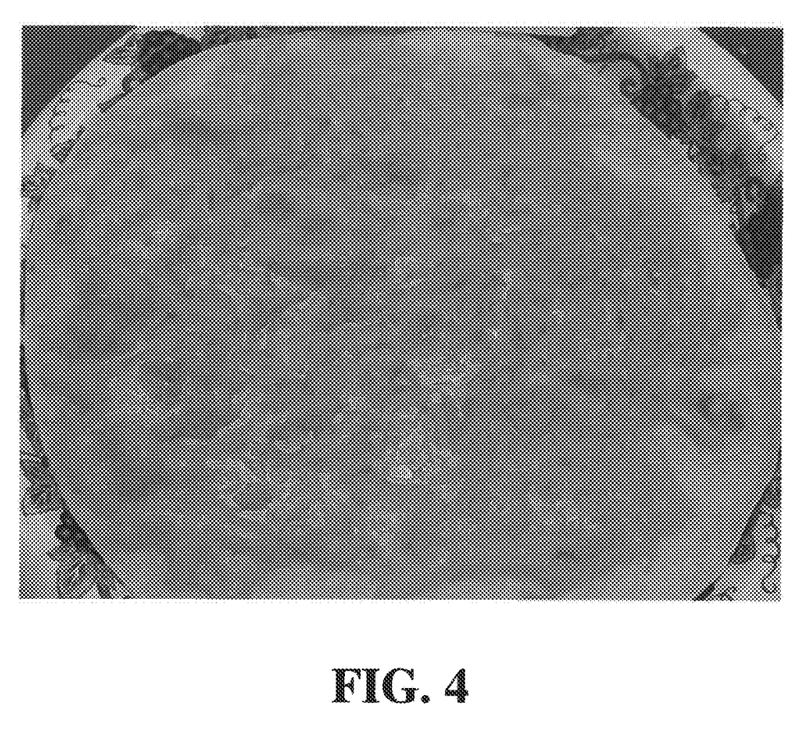
FIG. 4 is a picture of a melted cheese product made of 91 weight percent cheddar cheese shreds and 9 weight percent dairy powder topically applied thereto.

The melted appearance of the cheddar cheese control and experimental cheddar cheese shreds are shown in FIGS. 1-4. FIG. 1 shows the control cheese tortilla after melting. Even after melting, the integrity of the individual cheese shreds is still apparent in a majority of the cheese, especially toward the center of the mass. The cheese has a slightly oily appearance and has not formed a completely smooth, homogenous mass. FIGS. 2-4 show the melted cheddar cheese samples wherein cream cheese powder of varying amounts was topically applied prior to melting. FIG. 2 shows the cheddar cheese with 3% dairy powder. FIG. 3 shows the cheddar cheese with 6% dairy powder. FIG. 4 shows the cheddar cheese with 9% dairy powder. When comparing FIGS. 2-4 to the control shown in FIG. 1, it is readily apparent that the cheese shreds with the dairy powder topically applied melted to form a smoother, more homogenous cheese mass when compared to the control cheese. Specifically, the integrity of the cheese shreds in the control was more readily detectable after melting than the cheese shreds with dairy powder.

Example 3

A buttermilk powder and a cream cheese powder containing approximately 65% total fat, about 9.5% protein and about 14.5% total carbohydrates were each sprinkled onto natural mild cheddar cheese shreds by hand and lightly mixed to produce a substantially even surface coating. The buttermilk powder comprises dehydrated buttermilk solids. The nutritional make-up of the buttermilk powder contained approximately 4.5% fat, approximately 4% moisture, approximately 28% protein, and approximately 54% carbohydrates. The composition of the cream cheese powder was the same as that described in Example 1. An experimental cream cheese sample was created, with the cream cheese powder added at 2.5% by weight. Two experimental samples having the buttermilk powder were created, with the buttermilk powder added at 2.5% by weight to each sample of the cheese shreds.

In the first experimental buttermilk sample ("B1"), an anticaking agent was added at 3% by weight to the cheese shreds. The anticaking agent used was a mixture of potato starch, calcium sulfate, and natamycin. In the second experimental buttermilk sample ("B2"), a mixture of the same anticaking agent used in B1 and cellulose was added at 2% by weight to the cheese shreds. The experimental cream cheese sample contained a mixture of cellulose and natamycin at 2% by weight. For comparison purposes, a control sample of natural mild cheddar cheese shreds with 3% anticaking agent (the same as in B1) and no dairy powders was also prepared.

Forty grams of each cheese sample were applied evenly to separate tortillas. The cheese shreds were evaluated for cold appearance prior to melting. Presence of the buttermilk and cream cheese powders in the three experimental samples did not adversely affect visual appearance of the cheese shreds.

To test melting properties, a skillet was heated to 350° F. The tortillas with the cheese samples were placed on the skillet for four minutes. The resultant melted cheese tortillas were then evaluated for melted appearance.

The melted appearance of the cheese in both buttermilk samples and the cream cheese samples also improved. The B1 sample (2.5% buttermilk powder and 3% starch anticaking agent) showed a slight improvement in melting over the control. The B2 sample (2.5% buttermilk powder, 2% cellulose-based anticaking agent) showed better melting than B1. The cheese sample having the cream cheese powder coating (2.5% cream cheese powder, 2% cellulose-based anticaking agent/natamycin blend) demonstrated the most improved melt, having a smoother and more even appearance upon melting than the control cheese and buttermilk counterparts.

Figure 5:
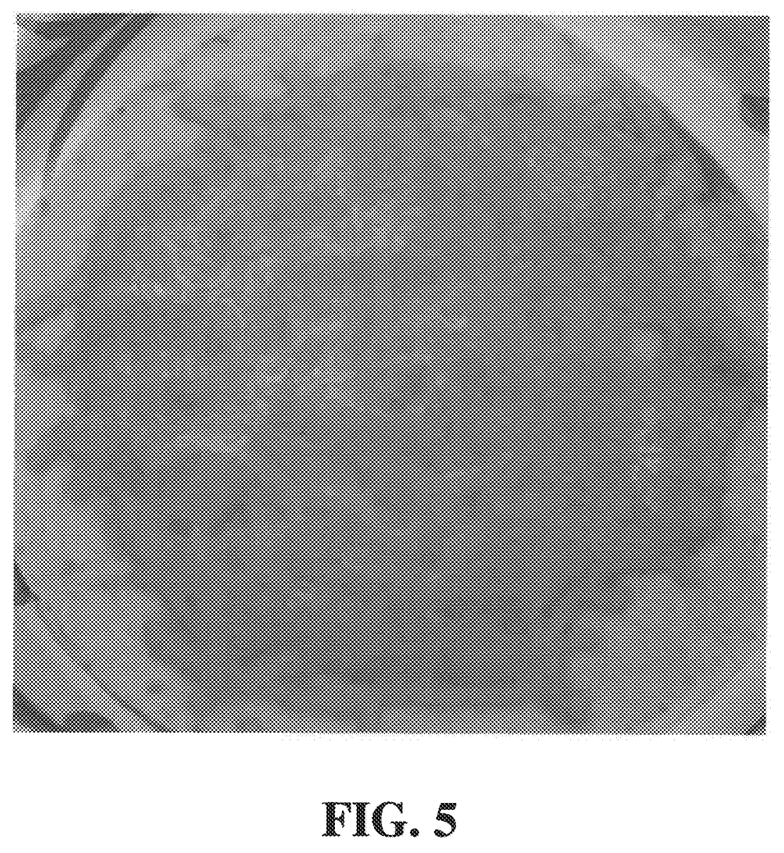
FIG. 5 is a picture of a melted cheese product made of 97 weight percent cheddar cheese shreds and 3 weight percent anticaking agent applied thereto.
Figure 6:
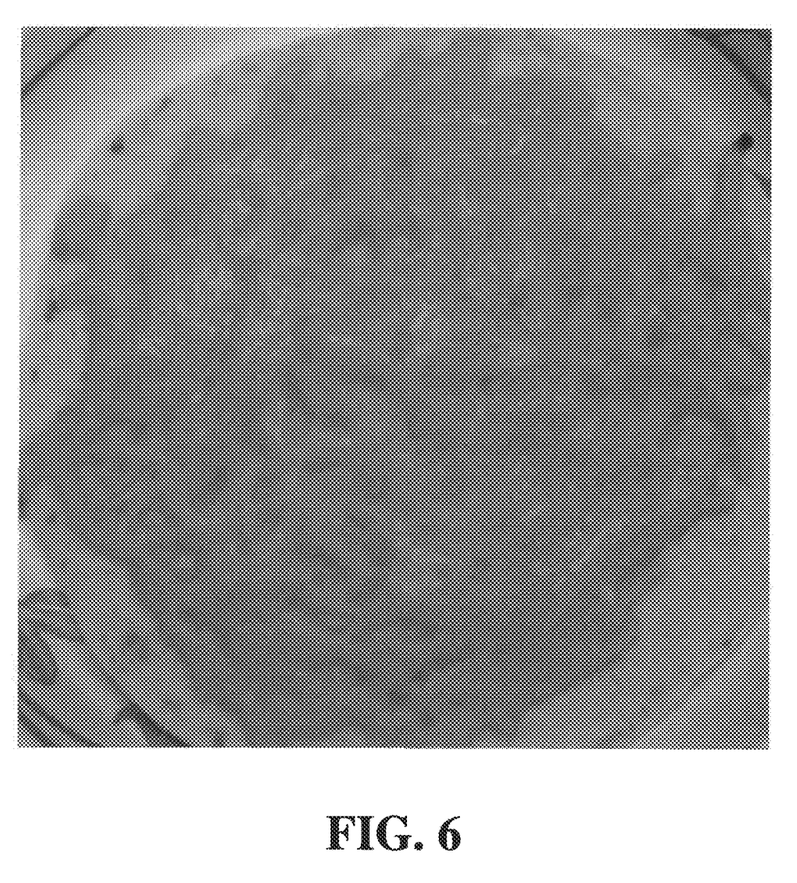
FIG. 6 is a picture of a melted cheese product made of 94.5 weight percent cheddar cheese shreds, 3 weight percent anticaking agent and 2.5 percent dairy powder topically applied thereto.
Figure 7:
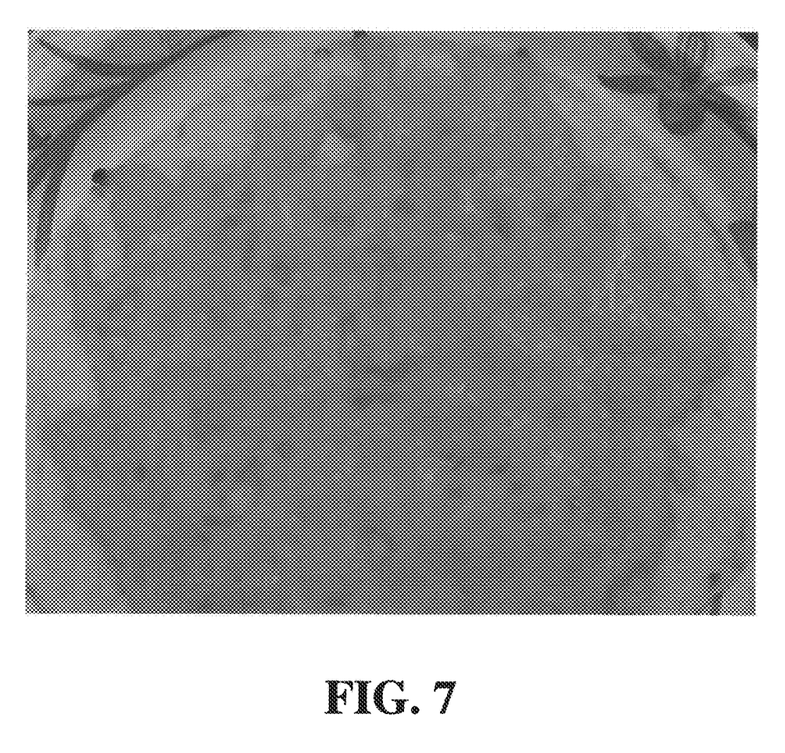
FIG. 7 is a picture of a melted cheese product made of 95.5 weight percent cheddar cheese shreds, 2 weight percent anticaking agent mixture and 2.5 percent dairy powder topically applied thereto.
Figure 8:
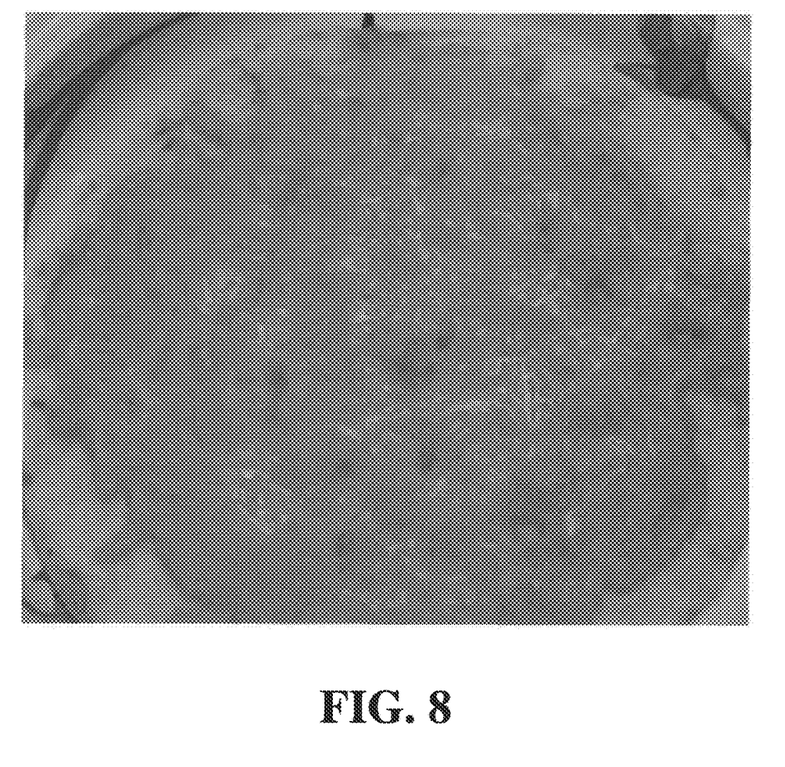
FIG. 8 is a picture of a melted cheese product made of 95.5 weight percent cheddar cheese shreds, 2 weight percent anticaking agent mixture and 2.5 percent dairy powder topically applied thereto.

The melted appearances of these samples are shown in FIGS. 5-8. FIG. 5 shows the control cheese tortilla after melting. Even after melting, the integrity of the individual cheese shreds is still apparent in a majority of the cheese. The cheese has a slightly oily appearance and has not formed a completely smooth, homogenous mass. FIG. 6 shows the B1 sample while FIG. 7 shows the B2 sample. When comparing FIG. 6 to the control shown in FIG. 5, it is apparent that the cheese shreds with the buttermilk powder topically applied melted to form a smoother, more homogenous cheese mass when compared to the control cheese. When comparing FIG. 7 to FIGS. 5 and 6, it is apparent that the cheese shreds with the buttermilk powder and the cellulose-based anticaking agent melted to form a smoother, more homogenous cheese mass when compared to both the control cheese and the buttermilk powder cheese with the traditional starch-based anticaking agent. FIG. 8 shows the cheese sample with the cream cheese powder and cellulose-based anticaking agent/natamycin blend. When comparing FIG. 8 to FIGS. 5-7, it is readily apparent that the cheese shreds having the cream cheese powder topically applied thereto have melted to form a smoother, more homogenous cheese mass than the control and both buttermilk powder samples. Specifically, the identity of the cheese shreds in the control and in the B1 and B2 samples were more readily detectable after melting than the cheese shreds with cream cheese powder.

Example 4

A central location consumer taste test was performed to compare the inventive cheese product to a competitive cheese on the market. A total of 309 respondents participated in the taste test in a total of six different locations throughout the United States. Respondents tasted mozzarella varieties of the inventive cheese and competitive cheese on two separate pizzas, each made with Mama Mary's Thin & Crispy Pizza Crust and Ragu Homestyle Pizza Sauce. The inventive cheese contained approximately 2.5% cream cheese powder that was sprinkled thereon immediately after shredding. The inventive cheese additionally contained about 2% cellulose-based anticaking agent/natamycin blend.

Product codes for all three pizza ingredients were rotated to eliminate order bias, including the order in which the inventive and competitive cheese pizzas were tasted. Respondents were asked to cleanse their palate both before tasting the first pizza and again before tasting the second pizza. Based upon a self-administered questionnaire, 63.4% of respondents indicated that the cheese pizza using the inventive cheese was creamier than the pizza using the competitive cheese. 2.6% of the respondents had no opinion on the question.

Example 5

Another consumer taste test was performed. Consumers were given shredded cheese samples of the inventive cheese and asked to compare it to the other types of shredded cheese they currently buy. Of 314 respondents, 80% stated that it was somewhat or much better and more creamy than other shredded cheese products. Of 306 respondents who used the inventive cheese melted on top of or inside a dish or food, 72% responded that it melted in or on their dish somewhat or much better than other shredded cheeses.

Overall, 87% of respondents thought the creaminess of the cheese after melting was "just about right," 91% thought the oiliness of the cheese after melting was "just about right," 95% thought the moisture of the cheese after melting was "just about right," and 93% thought the chewiness of the cheese after melting was "just about right."

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

What is claimed is:

1. A cheese product having improved melting and organoleptic properties comprising:
   a plurality of cheese pieces, each cheese piece having a mass and an exterior surface area; and
   a powdered coating comprising one or more dairy powders adhered to the exterior surface areas of the plurality of cheese pieces, the coating having a mass that is about 1% to about 15% the mass of the cheese pieces.

2. The cheese product of claim 1 wherein the coating is about 1% to about 9% the mass of the cheese pieces.

3. The cheese product of claim 1 wherein the coating is about 1% to about 6% the mass of the cheese pieces.

4. The cheese product of claim 1 wherein the coating is about 1% to about 3% the mass of the cheese pieces.

5. The cheese product of claim 1 further comprising one or more additives selected from the group consisting of starch, powdered cellulose, cellulose gels, rice flour, other anticaking ingredients, or mixtures thereof.

6. The cheese product of claim 1 wherein the coating covers from about 15% to about 100% of the exterior surface areas of the cheese pieces.

7. The cheese product of claim 1 wherein the coating covers from about 50% to about 80% of the exterior surface areas of the cheese pieces.

8. The cheese product of claim 1 wherein the plurality of cheese pieces are selected from the group consisting of mild cheddar, sharp cheddar, mozzarella, low-moisture part-skim mozzarella, Monterey jack, pepper jack, Colby, Romano, Parmesan, asiago, provolone, queso quesadilla, asadero, Havarti, Swiss, Muenster, Gouda, or mixtures thereof.

9. The cheese product of claim 1 wherein the dairy powder is selected from the group consisting of cheese powders, dried cream, or fatted milk protein concentrate.

10. The cheese product of claim 9 wherein the dairy powder is a dehydrated cream cheese powder or a cheddar cheese powder.

11. A cheese product having improved melting and organoleptic properties comprising:
a plurality of cheese pieces, each cheese piece having an exterior surface with a surface area and a moisture content; and
a dry coating comprising one or more dairy powders coating from about 15% to about 100% of the surface area of the cheese pieces, the coating having a moisture content and a mass that is about 1% to about 15% the mass of the cheese piece;
and wherein the difference in moisture contents between the one or more cheese pieces and the dairy powder is at least 20%.

12. The cheese product of claim 11 wherein the coating is applied at amounts of about 1% by weight to about 9% by weight of the cheese piece.

13. The cheese product of claim 11 wherein the coating is applied at amounts of about 1% by weight to about 6% by weight of the cheese piece.

14. The cheese product of claim 11 wherein the coating is applied at amounts of about 1% by weight to about 3% by weight of the cheese piece.

15. The cheese product of claim 11 further comprising one or more additives selected from the group consisting of starch, powdered cellulose, cellulose gels, rice flour, other anticaking ingredients, or mixtures thereof.

16. The cheese product of claim 11 wherein the dairy powder coats from about 65% to about 90% of the surface area of the cheese pieces.

17. The cheese product of claim 11 wherein the dairy powder coats from about 50% to about 80% of the surface area of the cheese pieces.

18. The cheese product of claim 11 wherein the plurality of cheese pieces are selected from the group consisting of mild cheddar, sharp cheddar, mozzarella, low-moisture part-skim mozzarella, Monterey jack, pepper jack, Colby, Romano, Parmesan, asiago, provolone, queso quesadilla, asadero, Havarti, Swiss, Muenster, Gouda or mixtures thereof.

19. The cheese product of claim 11 wherein the dairy powder is selected from the group consisting of cheese powders, dried cream, or fatted milk protein concentrate.

20. The cheese product of claim 9 wherein the dairy powder is a dehydrated cream cheese powder or a cheddar cheese powder.

21. A plurality of coated cheese pieces, each coated cheese piece comprising:
a core comprising one or more cheeses; and
an outer coating comprising one or more cheese powders;
wherein the core has a first mass and the outer coating has a second mass that is about 1% to about 15% of the first mass.

22. The plurality of coated cheese pieces of claim 21, wherein the cores of the plurality of cheese pieces each have a width of about 1 to about 5 mm and a length of about 6.55 mm to about 65 mm.

23. The plurality of coated cheese pieces of claim 22, wherein the one or more cheeses comprising the cores are selected from the group consisting of mild cheddar, sharp cheddar, mozzarella, low-moisture part-skim mozzarella, Monterey jack, pepper jack, Colby, Romano, Parmesan, asiago, provolone, queso quesadilla, asadero, Havarti, Swiss, Muenster, Gouda or mixtures thereof.

24. The plurality of coated cheese pieces of claim 22, wherein the outer coating comprises dehydrated cream cheese powder, cheddar cheese powder, or mixtures thereof.

25. The plurality of coated cheese pieces of claim 24, wherein the outer coating contains about 0.5% to about 10% moisture.

26. The plurality of coated cheese pieces of claim 25, wherein the second mass is from about 1% to about 9% of the first mass, and wherein the outer coating covers about 50% to about 80% of the core.

* * * * *